(12) United States Patent
Satoh et al.

(10) Patent No.: US 6,807,023 B2
(45) Date of Patent: Oct. 19, 2004

(54) METHOD AND APPARATUS FOR DUBBING A RECORDING TAPE LOADED WITH INFORMATION

(75) Inventors: Seiichi Satoh, Mito (JP); Noriyuki Nakazawa, Mito (JP); Hiroshi Takaku, Ishioka (JP)

(73) Assignee: Victor Company of Japan, Ltd., Yokohama (JP)

( * ) Notice: Subject to any disclaimer, the term of this patent is extended or adjusted under 35 U.S.C. 154(b) by 395 days.

(21) Appl. No.: 09/976,020

(22) Filed: Oct. 15, 2001

(65) Prior Publication Data

US 2002/0063980 A1 May 30, 2002

(30) Foreign Application Priority Data

Nov. 30, 2000 (JP) .......................................... 2000-364440

(51) Int. Cl.[7] .................................................. G11B 5/86
(52) U.S. Cl. ...................................... 360/15; 360/73.01
(58) Field of Search .............................. 360/15, 16, 17, 360/73.01

(56) References Cited

U.S. PATENT DOCUMENTS 4,866,543 A * 9/1989 Cooper et al. ................ 360/15
5,689,559 A * 11/1997 Park ............................ 380/203
5,715,104 A * 2/1998 Takada et al. ................ 360/15

FOREIGN PATENT DOCUMENTS

| JP | 60-167124 | 8/1985 |
|---|---|---|
| JP | 4-247304 | 9/1992 |
| JP | 4-301283 | 10/1992 |
| JP | 8-98131 | 4/1996 |
| JP | 8-321093 | 12/1996 |

* cited by examiner

*Primary Examiner*—David Hudspeth
*Assistant Examiner*—Daniell L Negron
(74) *Attorney, Agent, or Firm*—Louis Woo

(57) ABSTRACT

Each of slave recorders includes a rotary drum, heads mounted on the rotary drum at positions spaced from a phase reference position on the rotary drum by different angular intervals respectively, and an arrangement for selecting at least one from the heads as an active head in accordance with a designated recording mode. Non-delayed stream data are delayed by a delay time interval to form delayed stream data. A distributor operates for distributing the delayed stream data to the slave recorders. Each of the slave recorders records the delayed stream data on a slave recording medium by the active head. The delay time interval corresponds to the angular interval between the phase reference position and the position of the active head.

6 Claims, 15 Drawing Sheets

METHOD AND APPARATUS FOR DUBBING A RECORDING TAPE LOADED WITH INFORMATION

BACKGROUND OF THE INVENTION

1. Field of the Invention

This invention relates to a method of dubbing information from a recording tape onto other recording tapes. This invention also relates to an apparatus for dubbing information from a recording tape onto other recording tapes.

2. Description of the Related Art

A conventional simple dubbing system reproduces analog information from a recording tape, and records the reproduced analog information on another recording tape. A prior-art multiple dubbing system reproduces analog information from a recording tape, and records the reproduced analog information on a plurality of recording tapes at the same time. The prior-art multiple dubbing system is incapable of handling digital information.

SUMMARY OF THE INVENTION

It is a first object of this invention to provide an improved method of dubbing information from a recording tape onto other recording tapes.

It is a second object of this invention to provide an improved apparatus for dubbing information from a recording tape onto other recording tapes.

A first aspect of this invention provides an apparatus for dubbing information onto a plurality of slave recording mediums. The apparatus comprises a plurality of slave recorders each including a rotary drum, heads mounted on the rotary drum at positions spaced from a phase reference position on the rotary drum by different angular intervals respectively, and means for selecting at least one from the heads as an active head in accordance with a designated recording mode; means for delaying non-delayed stream data by a delay time interval to form delayed stream data; and a distributor for distributing the delayed stream data to the slave recorders, wherein each of the slave recorders records the delayed stream data on a slave recording medium by the active head; wherein the delay time interval corresponds to the angular interval between the phase reference position and the position of the active head.

A second aspect of this invention provides a method of dubbing information onto a plurality of slave recording mediums. The method comprises the steps of delaying non-delayed digital data by a delay time interval to form delayed digital data; distributing the delayed digital data to slave recorders each including a rotary drum, and at least one head mounted on the rotary drum; and recording the delayed digital data on a plurality of slave recording mediums by the slave recorders; wherein the delay time interval corresponds to a phase of a position of the head relative to a phase reference on the rotary drum.

A third aspect of this invention is based on the second aspect thereof, and provides a method further comprising the step of generating parity data in response to the delayed digital data.

A fourth aspect of this invention is based on the second aspect thereof, and provides a method further comprising the steps of generating parity data in response to the non-delayed digital data, checking the non-delayed digital data in response to the parity data, and indicating a result of said checking.

A fifth aspect of this invention is based on the second aspect thereof, and provides a method further comprising the steps of storing original digital data into a recording disk, and reading out the original digital data from the recording disk as the non-delayed digital data.

A sixth aspect of this invention is based on the second aspect thereof, and provides a method further comprising the step of descrambling scrambled digital data into the non-delayed digital data.

DETAILED DESCRIPTION OF THE INVENTION

A prior-art dubbing system will be explained below for a better understanding of this invention.

Figure 1:
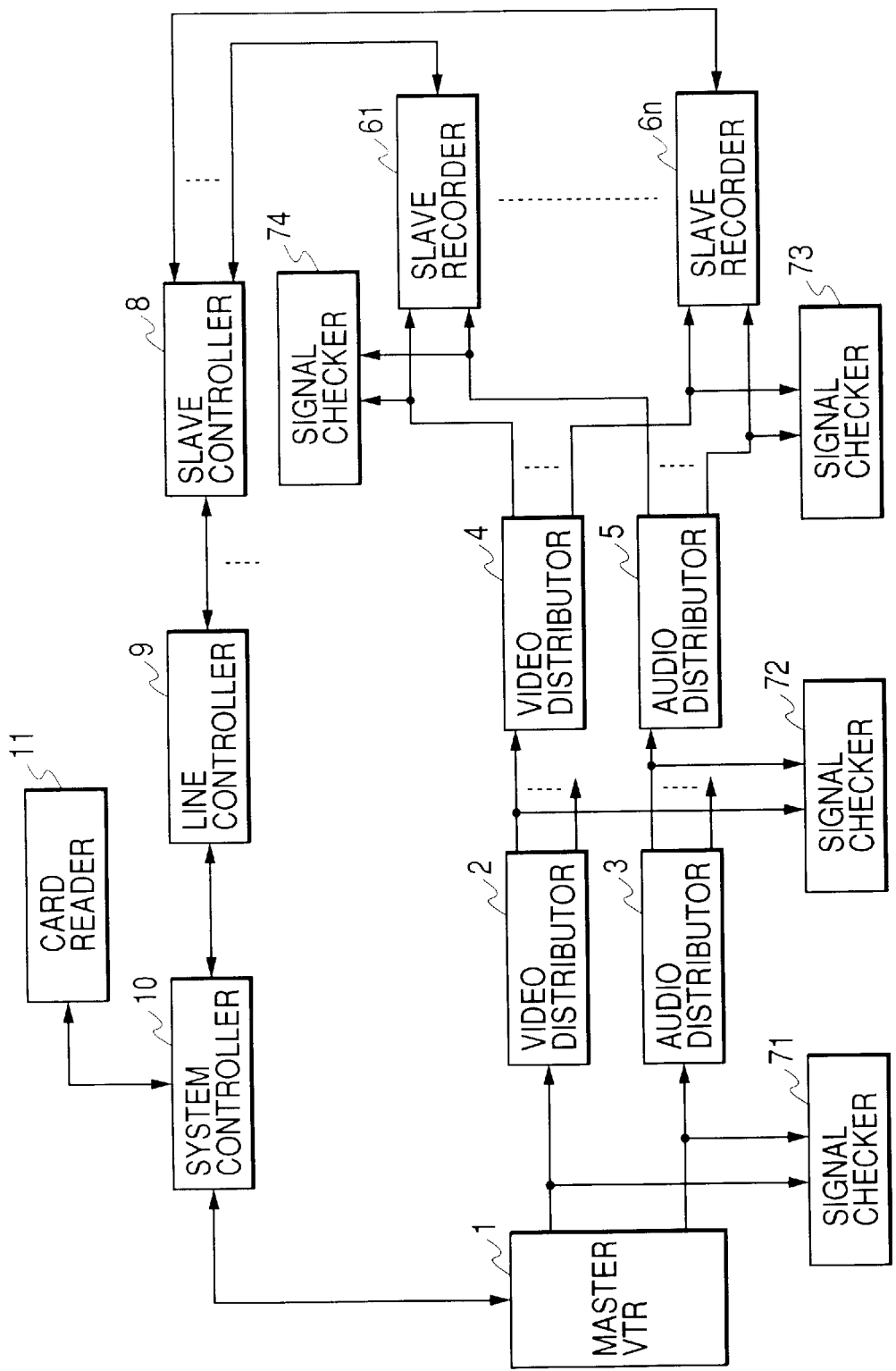
FIG. 1 is a block diagram of a prior-art dubbing system.

FIG. 1 shows a prior-art dubbing system which includes a master VTR (video tape recorder) 1, a video distributor 2, an audio distributor 3, a video distributor 4, an audio distributor 5, slave recorders 61, . . . , and 6n ("n" denotes a given natural number), signal checkers 71, 72, 73, and 74, a slave controller 8, a line controller 9, a system controller 10, and a card reader 11.

In the prior-art dubbing system of FIG. 1, the master VTR 1 reproduces an analog video signal and an analog audio signal from a master magnetic tape. The master VTR 1 feeds the reproduced analog video signal to the video distributor 2. The master VTR 1 feeds the reproduced analog audio signal to the audio distributor 3.

The video distributor 2 and the audio distributor 3 compose a first stage while the video distributor 4 and the audio distributor 5 form a second stage following the first stage. The device 2 distributes the analog video signal to video lines, one of which leads to the video distributor 4. Thus, the video distributor 4 receives the analog video signal. The device 3 distributes the analog audio signal to audio lines, one of which leads to the audio distributor 5. Thus, the audio distributor 5 receives the analog audio signal. The device 4 distributes the analog video signal to the slave recorders 61, ..., and 6n. The device 5 distributes the analog audio signal to the slave recorders 61, ..., and 6n.

The slave recorders 61, ..., and 6n dub the analog video signal and the analog audio signal onto slave magnetic tapes. Accordingly, the analog video signal and the analog audio signal are dubbed from the master magnetic tape onto the slave magnetic tapes.

During operation of the prior-art dubbing system in FIG. 1, the master VTR 1 is controlled by the system controller 10 while the slave recorders 61, ..., and 6n are controlled by the slave controller 8. The card reader 11 and the system controller 10 can communicate with each other. The line controller 9 and the slave controller 8 can communicate with each other. Furthermore, the line controller 9 and the system controller 10 can communicate with each other.

Figure 2:
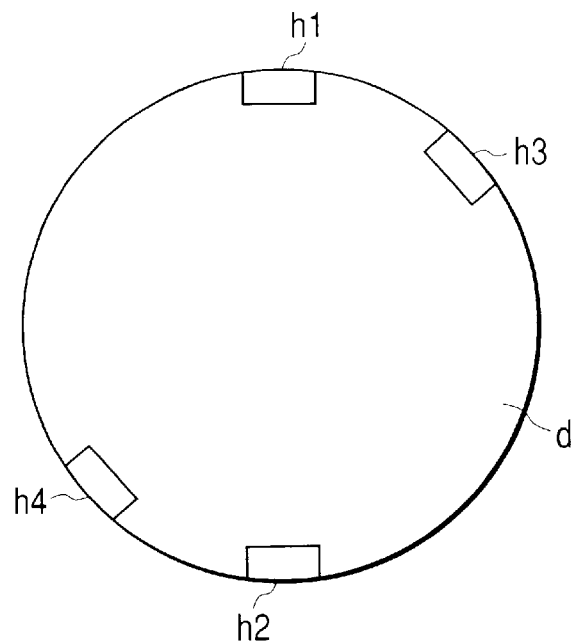
FIG. 2 is a diagram of a rotary drum and heads in a slave recorder in the prior-art dubbing system of FIG. 1.
Figure 3:
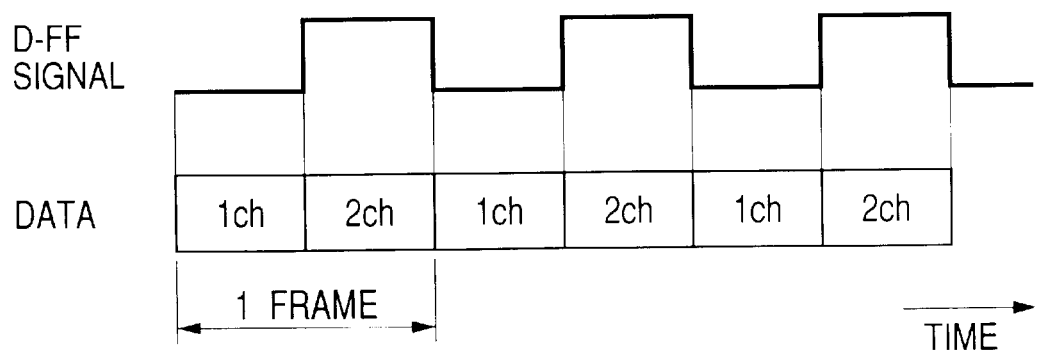
FIG. 3 is a time-domain diagram of a D-FF signal and data in the slave recorder in the prior-art dubbing system of FIG. 1.

Each of the slave recorders 61, ..., and 6n has a rotary drum "d". As shown in FIG. 2, four heads h1, h2, h3, and h4 are mounted on the rotary drum "d". The heads h1 and h2 are diametrically opposed to each other. Similarly, the heads h3 and h4 are diametrically opposed to each other. A suitable device (not shown) generates detection pulses which depend on the rotational speed of the rotary drum "d". Another suitable device (not shown) generates a D-FF signal in response to the detection pulses. The heads h1, h2, h3, and h4 record the analog video signal and the analog audio signal on the slave magnetic tape on a frame-by-frame basis responsive to the D-FF signal. Specifically, the heads h1 and h2 are used for the analog video signal while the heads h3 and h4 are used for the analog audio signal. The heads h1 and h3 are assigned to a first channel 1ch. The heads h2 and h4 are assigned to a second channel 2ch. As shown in FIG. 3, the analog video signal (data) is alternately fed to the heads h1 and h2 (the first and second channels 1ch and 2ch respectively) at a period equal to half the period of the D-FF signal. The analog audio signal (data) is alternately fed to the heads h3 and h4 (the first and second channels 1ch and 2ch respectively) at a period equal to half the period of the D-FF signal.

In the prior-art dubbing system of FIG. 1, the signal checker 71 monitors signals at the output sides of the master VTR 1, that is, at the input sides of the video distributor 2 and the audio distributor 3. The signal checker 72 monitors signals at the output sides of the video distributor 2 and the audio distributor 3, that is, at the input sides of the video distributor 4 and the audio distributor 5. The signal checkers 73 and 74 monitor signals at the output sides of the video distributor 4 and the audio distributor 5, that is, at the input sides of the slave recorders 61, ..., and 6n. Each of the video distributors 2 and 4 and the audio distributors 3 and 5 has a gain adjustment function. The prior-art dubbing system of FIG. 1 is incapable of handling a digital video signal and a digital audio signal.

Embodiment

Figure 4:
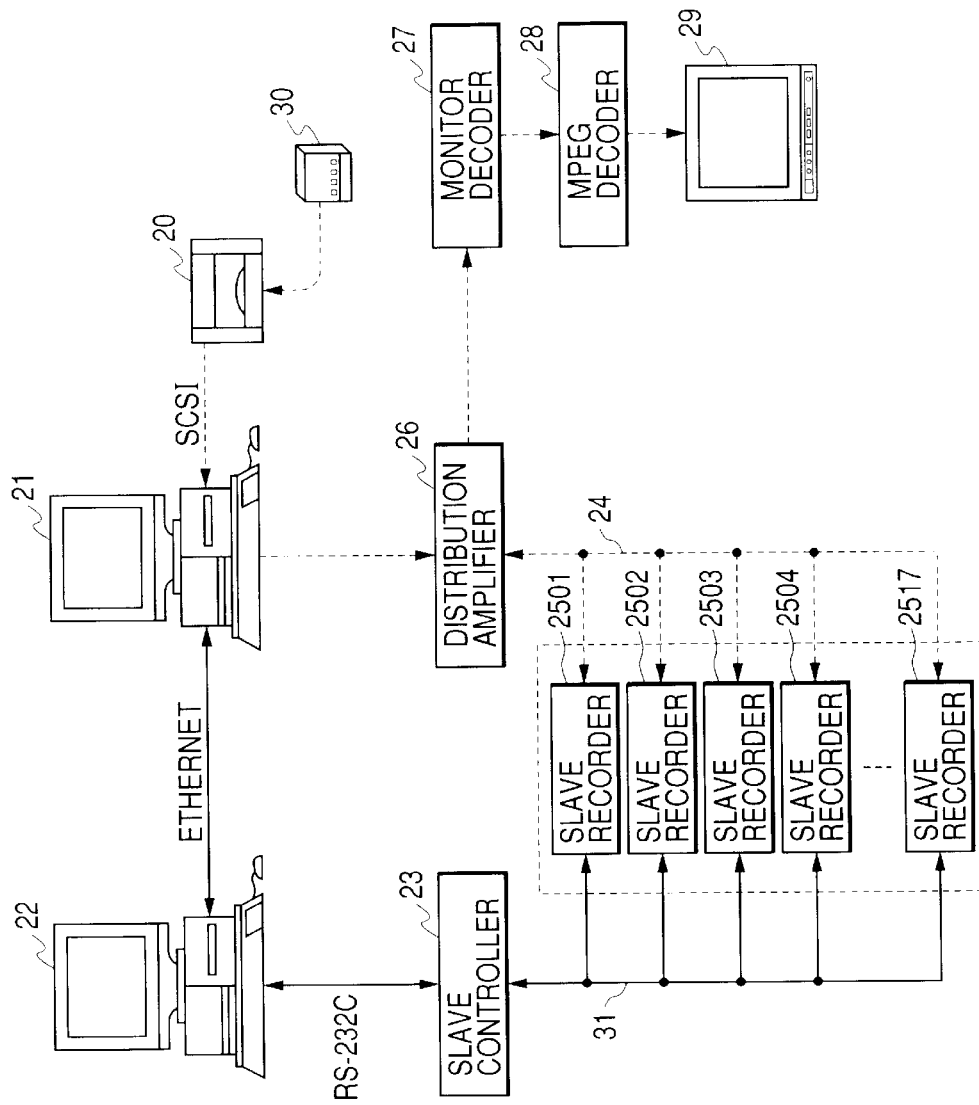
FIG. 4 is a block diagram of a D-VHS digital dubbing system according to an embodiment of this invention.

FIG. 4 shows a D-VHS digital dubbing system according to an embodiment of this invention. The digital dubbing system of FIG. 4 includes a DLT (digital linear technology) device 20, a master server 21, a host personal computer (PC) 22, a slave controller 23, lines 24 and 31, slave recorders 2501, 2502, 2503, ..., and 2517, a distribution amplifier 26, a monitor decoder 27, an MPEG decoder 28, and a monitor 29. The DLT device 20 includes a tape drive developed by Digital Equipment Corporation. A DLT tape (a master magnetic tape) 30 can be placed in and driven by the DLT device 20. The host personal computer 22 includes a selector and a start button. It should be noted that the total number of the slave recorders 2501, 2502, 2503, ..., and 2517 may differ from "17".

The DLT device 20 is connected with the master server 21 via a SCSI. The master server 21 and the host personal computer 22 are connected with each other via an Ethernet. The master server 21 is connected with the distribution amplifier 26. The slave controller 23 is connected with the host personal computer 22 via an RS-232C interface. The slave controller 23 is connected with the slave recorders 2501, 2502, 2503, ..., and 2517 via the line 31. The distribution amplifier 26 is connected with the slave recorders 2501, 2502, 2503, ..., and 2517 via the line 24. The monitor decoder 27 is connected with the distribution amplifier 26. The MPEG decoder 28 is connected with the monitor decoder 27. The monitor 29 is connected with the MPEG decoder 28.

Figure 5:
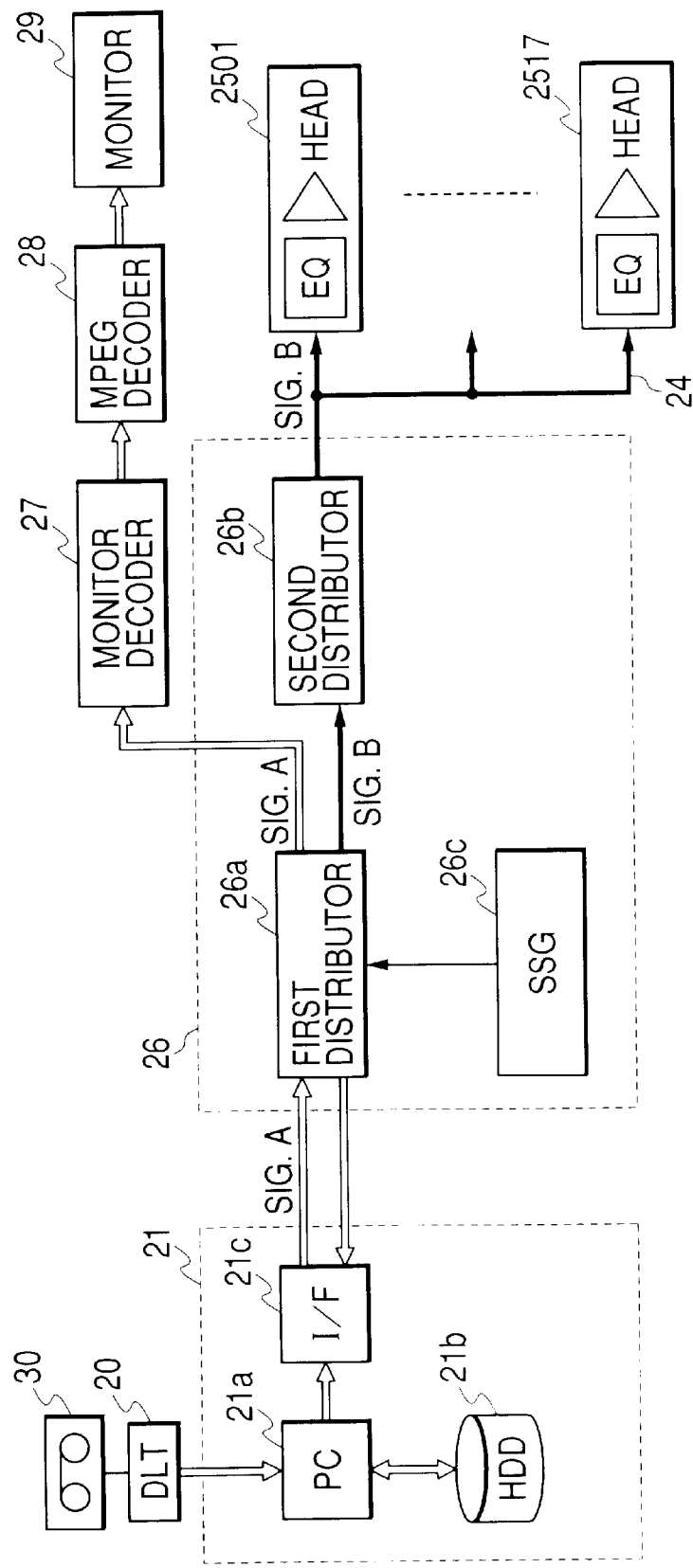
FIG. 5 is a block diagram of a portion of the dubbing system in FIG. 4.

As shown in FIG. 5, the master server 21 includes a personal computer (PC) 21a, a hard disk drive (HDD) 21b, and an interface (I/F) board 21c. The personal computer 21a is connected with the DLT device 20. In addition, the personal computer 21a is connected with the hard disk drive 21b and the interface board 21c. The interface board 21c is connected with the distribution amplifier 26.

As shown in FIG. 5, the distribution amplifier 26 includes a first distributor 26a, a second distributor 26b, and a standard signal generator (SSG) 26c. The first distributor 26a is connected with the interface board 21c in the master server 21. In addition, the first distributor 26a is connected with the monitor decoder 27.

Furthermore, the first distributor 26a is connected with the second distributor 26b and the standard signal generator 26c. The second distributor 26b is connected with the slave recorders 2501, 2502, 2503, ..., and 2517 via the line 24.

Operation of the digital dubbing system of FIG. 4 can be changed among different modes including a preliminary mode and a digital dubbing mode. The preliminary mode of operation precedes the digital dubbing mode of operation.

During the preliminary mode of operation, the DLT device 20 reproduces digital stream data from a DLT tape 30. The DLT device 20 feeds the reproduced stream data to the master server 21. The personal computer 21a in the master server 21 receives the reproduced stream data. The personal computer 21a outputs the stream data to the hard disk drive 21b and controls the hard disk drive 21b, thereby storing the stream data into a recording medium (a hard disk) within the hard disk drive 21b as a file having a name.

In some cases, digital stream data of interest are recorded on only one DLT tape 30. In these cases, the DLT device 20 reproduces digital stream data from only one DLT tape 30. In other cases, digital stream data of interest are divided into successive portions recorded on a plurality of DLT tapes 30 respectively. In these cases, the DLT device 20 sequentially reproduces digital stream data from a plurality of DLT tapes 30.

The preliminary mode of operation will be explained below in more detail. During the preliminary mode of operation, when a first DLT tape 30 is set in the DLT device 20, the DLT device 20 outputs a corresponding tape set signal to the personal computer 21a in the master server 21. The personal computer 21a makes an information file and a stream data accommodation file in the recording medium within the hard disk drive 21b in response to the tape set signal. Subsequently, the personal computer 21a controls the DLT device 20 to read out information data from the first DLT tape 30. The information data indicate the total size or the total track size of related digital stream data (digital stream data to be dubbed). The information data also indicate a title number and a title name concerning the stream data. The personal computer 21a receives the information data from the DLT device 20. The personal computer 21a controls the hard disk drive 21b, thereby storing the information data into the information file (in the recording medium within the hard disk drive 21b). Then, the personal computer 21a outputs a signal to the DLT device 20 which orders the reproduction of a first unit segment of digital stream data from the first DLT tape 30. As a result, the DLT device 20 reproduces the first unit segment of the stream data from the first DLT tape 30. The personal computer 21a receives the first unit segment of the stream data from the DLT device 20. The personal computer 21a controls the hard disk drive 21b, thereby storing the first unit segment of the stream data into the stream data accommodation file (in the recording medium within the hard disk drive 21b). The personal computer 21a calculates the size (the amount) of digital stream data currently placed in the stream data accommodation file. Thereafter, the personal computer 21a outputs a signal to the DLT device 20 which orders the reproduction of a second unit segment of the stream data from the first DLT tape 30. As a result, the DLT device 20 reproduces the second unit segment of the stream data from the first DLT tape 30. The personal computer 21a receives the second unit segment of the stream data from the DLT device 20. The personal computer 21a controls the hard disk drive 21b, thereby storing the second unit segment of the stream data into the stream data accommodation file. The personal computer 21a calculates the size (the amount) of digital stream data currently placed in the stream data accommodation file. The sequence of the unit-segment receiving step, the unit-segment storing step, the size calculating step is repetitively executed.

During the preliminary mode of operation, the DLT device 20 outputs an EOT (end of tape) signal to the master device 21 when the currently accessed point on the first DLT tape 30 reaches the tape end position. The personal computer 21a within the master device 21 receives the EOT signal. The personal computer 21a derives the total size of the stream data of interest (the stream data to be dubbed) from the information data in the information file. The personal computer 21a repetitively compares the calculated size of the stream data in the stream data accommodation file with the total size. The personal computer 21a repetitively decides whether or not the EOT signal is received before the calculated size of the stream data in the stream data accommodation file reaches the total size. In the case where the EOT signal is received before the calculated size of the stream data in the stream data accommodation file reaches the total size, the personal computer 21a judges a next DLT tape (a second DLT tape) 30 to be present. In this case, the personal computer 21a displays a command to replace the first DLT tape 30 in the DLT device 20 with a next one (a second DLT tape 30). Therefore, the first DLT tape 30 is removed from the DLT device 20, and a second DLT tape 30 is set therein. According to steps similar to the previously-mentioned steps about the first DLT tape 30, digital stream data are reproduced from the second DLT tape 30 by the DLT device 20 before being stored into the stream data accommodation file by the personal computer 21a. Digital stream data on third and later DLT tapes 30 are similarly handled as long as the calculated size of the stream data in the stream data accommodation file does not reach the total size.

During the preliminary mode of operation, the personal computer 21a repetitively compares the calculated size of the stream data in the stream data accommodation file with the total size as previously mentioned. When the calculated size of the stream data in the stream data accommodation file reaches the total size, the personal computer 21a decides that all the stream data of interest have been reproduced and been stored into the stream data accommodation file. In this case, the personal computer 21a controls the DLT device 20 to halt the reproduction of digital stream data from the current DLT tape 30. Thus, the personal computer 21a stops the reception of digital stream data from the DLT device 20. As a result of the preliminary mode of operation, all the stream data to be dubbed are stored in the stream data accommodation file in the hard disc drive 21b within the master server 21.

Figure 6:
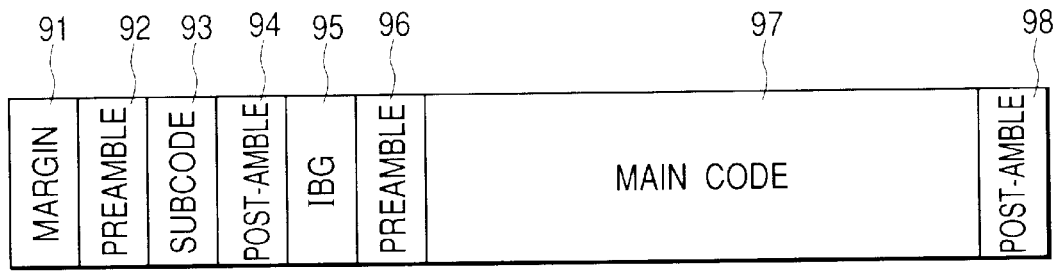
FIG. 6 is a diagram of the format of one recording track on a magnetic tape.

A DLT tape 30 is formed with an array of slant recording tracks along which a signal containing digital stream data is recorded. In general, the stream data are of a scrambled version for copy protection. Each recording track on the DLT tape 30 is composed of equal-size data blocks sequentially arranged in the direction of the scanning by a head. The data blocks are also referred to as the sync blocks. As shown in FIG. 6, one recording track has a sequence of a front margin area 91 of 2 sync blocks, a preamble area 92 of 3 sync blocks, a sub code area 93 of 4 sync blocks, a post-amble area 94 of 3 sync blocks, an IBG area 95 of 3 sync blocks, a preamble area 96 of 1 sync block, a main code area (data area) 97 of 336 sync blocks, and a post-amble area 98 of 2 sync blocks. Preferably, the post-amble area 98 is followed by a rear margin area. The main code area 97 and the sub code area 93 can be used for storing digital stream data.

During the preliminary mode of operation, the personal computer 21a descrambles every unit segment of the reproduced stream data into a unit segment of the stream data of a non-scrambled version. Immediately thereafter, the personal computer 21a controls the hard disk drive 21b, thereby storing the unit segment of the non-scrambled version into the stream data accommodation file (in the recording medium within the hard disk drive 21b). Specifically, the personal computer 21a generates key data in response to identification data peculiar to and owned by the master server 21. The personal computer 21a subjects the key data to a prescribed calculation procedure (a prescribed operation procedure), thereby generating an initial value for descrambling. The personal computer 21a descrambles every unit segment of the reproduced stream data into a unit segment of the stream data of a non-scrambled version in response to the initial value for descrambling.

Figure 7:
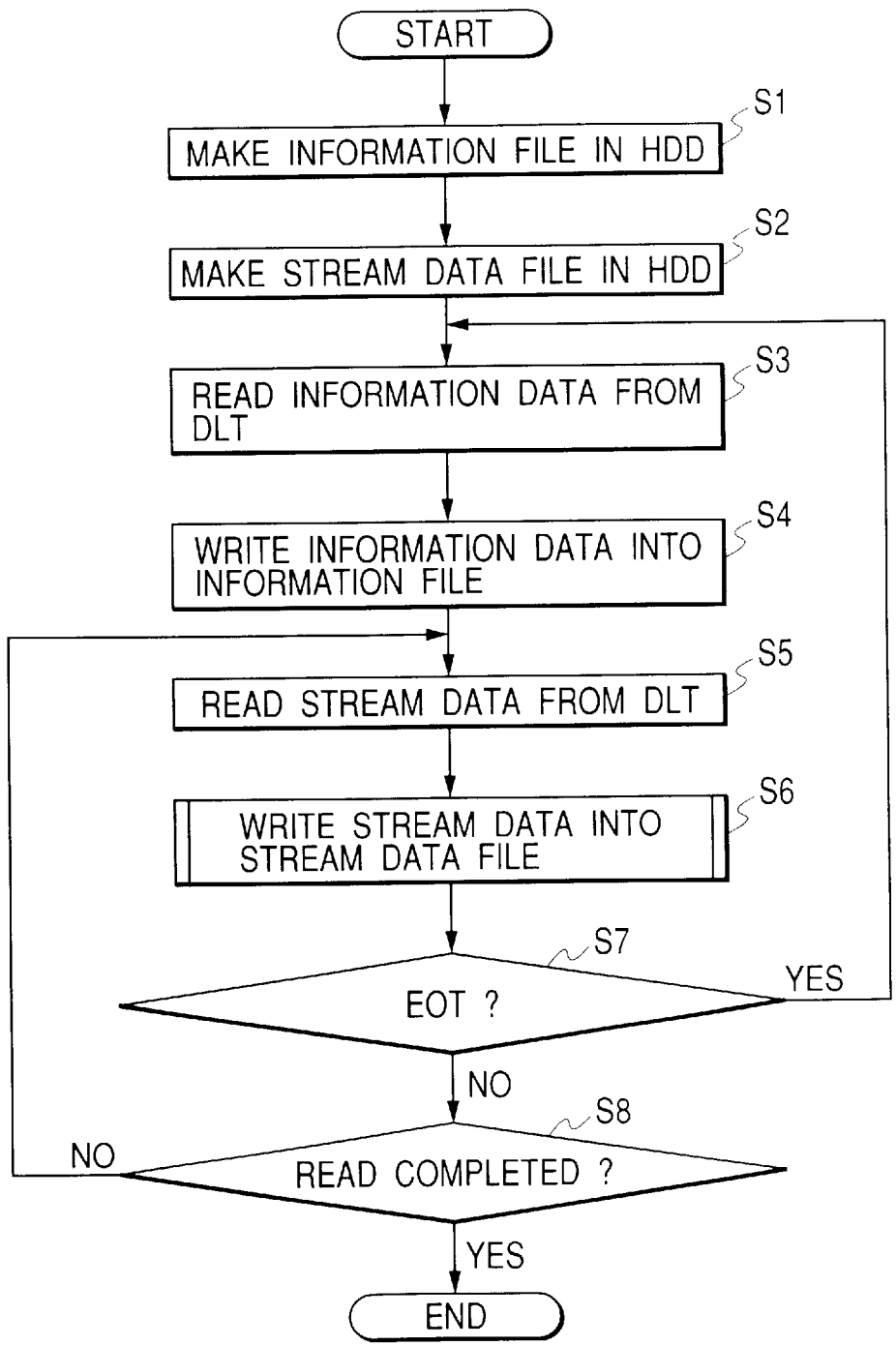
FIG. 7 is a flowchart of a portion of a control program for a personal computer in FIG. 5.

The personal computer 21a operates in accordance with a control program stored in its internal memory or recording medium. FIG. 7 is a flowchart of a portion of the control program which relates to the preliminary mode of operation. The program portion in FIG. 7 is started in response to a tape set signal outputted from the DLT device 20.

As shown in FIG. 7, a first step S1 of the program portion makes an information file in the hard disk drive 21b. A step S2 following the step S1 makes a stream data accommodation file in the hard disk drive 21b. After the step S2, the program advances to a step S3.

The step S3 controls the DLT device 20 to read out information data from a current DLT tape 30. The information data indicate the total size of related digital stream data (digital stream data to be dubbed). The step S3 receives the information data from the DLT device 20.

A step S4 following the step S3 controls the hard disk drive 21b, and thereby stores the information data into the information file. After the step S4, the program advances to a step S5.

The step S5 controls the DLT device 20 to reproduce a current unit segment of digital stream data from the DLT tape 30. The step S5 receives the current unit segment of the stream data from the DLT device 20.

A step S6 subsequent to the step S5 controls the hard disk drive 21b, and thereby stores the current unit segment of the stream data into the stream data accommodation file.

A step S7 following the step S6 decides whether or not an EOT signal is received from the DLT device 20. When an EOT signal is received, the program returns from the step S7 to the step S3.

Accordingly, in this case, the step S3 and the later steps are executed for a next DLT tape 30. On the other hand, when an EOT signal is not received, the program advances from the step S7 to a step S8.

The step S8 calculates the size (the amount) of digital stream data currently placed in the stream data accommodation file. The step S8 derives the total size of the stream data of interest (the stream data to be dubbed) from the information data in the information file. The step S8 compares the calculated size of the stream data in the stream data accommodation file with the total size to decide whether or not all the stream data of interest (the stream data to be dubbed) have been reproduced and been stored into the stream data accommodation file. When the calculated size is smaller than the total size, that is, when all the stream data of interest have not been reproduced and not been stored yet, the program returns from the step S8 to the step S5. On the other hand, when the calculated size is equal to the total size, that is, when all the stream data of interest have been reproduced and been stored, the program exits from the step S8 and then the current execution cycle of the program portion ends.

Figure 8:
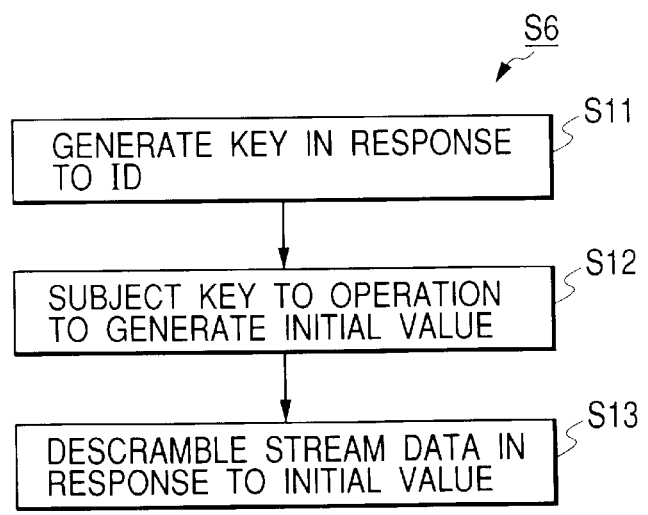
FIG. 8 is a flowchart of a block in FIG. 7.

The step S6 in FIG. 7 implements descrambling. Specifically, the step S6 descrambles the current unit segment of the stream data into a unit segment of the stream data of a non-scrambled version. The step S6 controls the hard disk drive 21b, and thereby stores the unit segment of the non-scrambled version into the stream data accommodation file. In more detail, as shown in FIG. 8, the step S6 includes sub-steps S11, S12, and S13. The sub-step S11 generates key data in response to identification data peculiar to and owned by the master server 21. The sub-step S12 which follows the sub-step S11 subjects the key data to a prescribed calculation procedure (a prescribed operation procedure), thereby generating an initial value for descrambling. The sub-step S13 which follows the sub-step S12 descrambles the current unit segment of the stream data into a unit segment of the stream data of a non-scrambled version in response to the initial value for descrambling.

As previously mentioned, the preliminary mode of operation is followed by the digital dubbing mode of operation. Digital stream data are selected among digital stream data in the steam data accommodation file as designated digital stream data by operating the selector in the host personal computer 22. In addition, the master server 21 and the line 24 are selected. Subsequently, the start button in the host personal computer 22 is depressed. When the start button is depressed, the host personal computer 22 transmits a start confirmation command to the master server 21. The digital dubbing mode of operation is commenced in response to the start confirmation command.

The master server 21 receives the start confirmation command. The master server 21 reads out the information data from the information file in response to the reception of the start confirmation command. The information data indicate the total size or the total track size of related digital stream data (digital stream data to be dubbed), and also a title number and a title name concerning the stream data. The master server 21 returns the read-out information data to the host personal computer 22 as a response to the start conformation command. The master server 21 displays the read-out information data on its monitor screen. Also, the host personal computer 22 displays the information data on its monitor screen. Thereafter, the host personal computer 22 transmits a dubbing start command to the slave controller 23. In the case where the slave controller 23 successfully receives the dubbing start command, the slave controller 23 returns a signal of command reception confirmation to the host personal computer 22 which represents the successful reception of the dubbing start command.

The host personal computer 22 receives the command reception confirmation signal. The host personal computer 22 transmits a stream data output command to the master server 21 in response to the reception of the command reception confirmation signal. The stream data output command contains an identification signal corresponding to the designated stream data. The master server 21 receives the stream data output command. The master server 21 extracts the identification signal from the stream data output command. The master server 21 selects the designated stream data among the stream data in the stream data accommodation file in response to the identification signal. The master server 21 transfers the designated stream data from the stream data accommodation file toward the distribution amplifier 26. The distribution amplifier 26 receives the designated stream data. The distribution amplifier 26 delays the received stream data by a time interval depending on a recording mode, and distributes the delayed stream data to the slave recorders 2501, 2502, 2503, . . . , and 2517 via the line 24. The slave recorders 2501, 2502, 2503, . . . , and 2517 dub the stream data on slave magnetic tapes, respectively, by digital recording. In this way, the digital dubbing mode of operation is implemented. The distribution amplifier 26 passes the received stream data to the monitor decoder 27. The contents of the stream data are transmitted from the monitor decoder 27 to the monitor 29 via the MPEG decoder 28, being displayed on the monitor 29. Thus, the contents of the stream data which are being dubbed are displayed on the monitor 29.

During the digital dubbing mode of operation, the master server 21 generates information related to conditions of the progress of the dubbing. In addition, the master server 21 generates information related to alarm when a given warning state occurs. The master server 21 continuously or intermittently transmits the dubbing-progress-related information and the alarm-related information to the host personal computer 22. The host personal computer 22 receives the dubbing-progress-related information and the alarm-related information. The host personal computer 22 displays the conditions of the progress of the dubbing on its monitor screen which correspond to the dubbing-progress-related information. The host personal computer 22 displays alarm occurrence time in response to the reception of the alarm-related information.

During the digital dubbing mode of operation, the host personal computer 22 continues to transmit a status request command to the slave controller 23. The slave controller 23 receives the status request command. The slave controller 23 gets status information from each of the slave recorders 2501, 2502, 2503, . . . , and 2517 via the line 31. The slave controller 23 returns the status information to the host personal computer 22 as a response to the status request command. The host personal computer 22 receives the status information. The host personal computer 22 successively displays the status information on its display screen.

When the transfer of the designated stream data to the distribution amplifier 26 from the master server 21 terminates, the master server 21 transmits an end command to the host personal computer 22. The host personal computer 22 receives the end command. The host personal computer 22 transmits a stop command to the slave controller 23 in response to the reception of the end command. The slave controller 23 receives the stop command. In response to the reception of the stop command, the slave controller 23 transmits a recording stop command and a tape-cassette ejection command to each of the slave recorders 2501, 2502, 2503, . . . , and 2517 via the line 31. The slave recorders 2501, 2502, 2503, . . . , and 2517 receive the recording stop command and the tape-cassette ejection command. Each of the slave recorders 2501, 2502, 2503, . . . , and 2517 moves out of a recording operation state in response to the received recording stop command. Each of the slave recorders 2501, 2502, 2503, . . . , and 2517 ejects the cassette of the slave magnetic tape in response to the received tape-cassette ejection command. As a result, the digital dubbing mode of operation ends.

A specified file is provided in the host personal computer 22. When the digital dubbing mode of operation ends, the host personal computer 22 loads the specified file with pieces of information which represent various dubbing-related parameters such as dubbing start time and dubbing end time. At a later stage, the contents of the dubbing can be known by referring to the information pieces in the specified file.

With reference to FIG. 5, the DLT device 20 reproduces the stream data from the DLT tape 30 set therein. The master server 21 receives the reproduced stream data from the DLT device 20. The master server 21 stores the received stream data into the stream data accommodation file in the hard disk drive 21b via the personal computer 21a.

The master server 21 reads out the stream data from the stream data accommodation file via the personal computer 21a at a suitable timing such that the read-out stream data will fit the recording timings of digital dubbing by the slave recorders 2501, 2502, 2503, . . . , and 2517 and will conform to the D-VHS format. In general, the read-out stream data divide into first stream data DATA1 and second stream data DATA2. In other words, the read-out stream data are composed of first stream data DATA1 and second stream data DATA2. The master server 21 feeds the read-out stream data to the interface board 21c from the personal computer 21a. The stream data are outputted from the interface board 21c of the master server 21 toward the distribution amplifier 26 as digital data "Sig. A".

Specifically, the stream data are outputted from the interface board 21c in synchronism with a clock signal (a bit clock signal) generated in the digital dubbing system. The clock signal is outputted from the interface board 21c together with the stream data. The interface board 21c generates parity data for checking conditions of the transmission of the stream data. The parity data are outputted from the interface board 21c in synchronism with the clock signal. The interface board 21c groups or combines the stream data, the parity data, and the clock signal into the digital data "Sig. A". The interface board 21c outputs the digital data "Sig. A" to the distribution amplifier 26.

Figure 9:
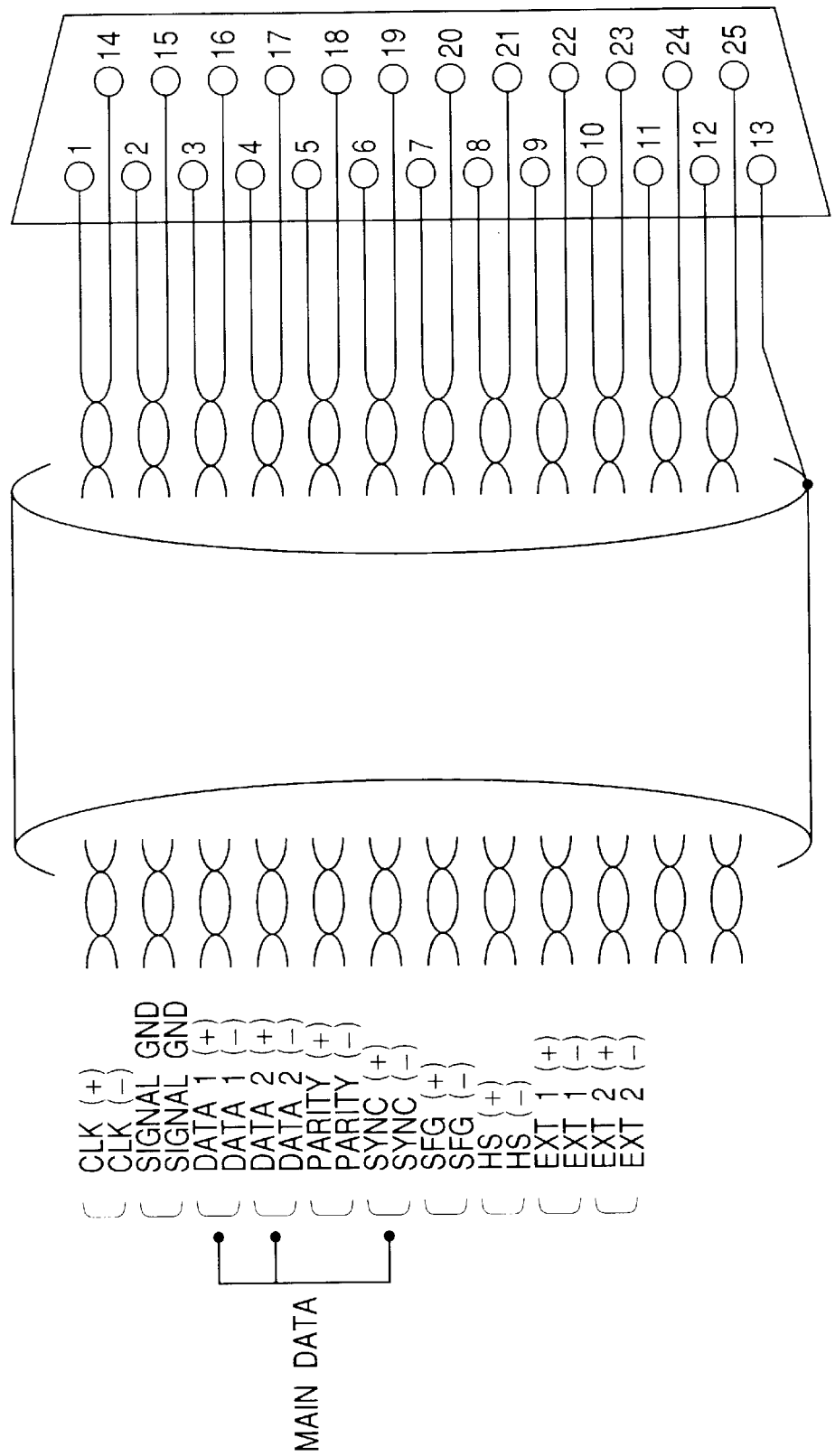
FIG. 9 is a diagram of a connection cable in the dubbing system of FIG. 4.

FIG. 9 shows a cable of the connection between the interface board 21c and the distribution amplifier 26. The connection cable has signal lines including ones as follows:

(1) a positive clock signal line CLK(+) and a negative clock signal line CLK(−) for the transmission of the clock signal;

(2) first and second ground lines SIGNAL GND;

(3) a first positive dubbing data signal line DATA1(+), a first negative dubbing data signal line DATA1(−), a second positive dubbing data signal line DATA2(+), and a second negative dubbing data signal line DATA2(−) for the transmission of the stream data;

(4) a positive parity data signal line PARITY(+) and a negative parity data signal line PARITY(−) for the transmission of the parity data;

(5) a positive sync signal line SYNC(+) and a negative sync signal line SYNC(−) for the transmission of a sync signal (a field sync signal or a frame sync signal);

(6) a positive frame discrimination data signal line SFG(+) and a negative frame discrimination data signal line SFG(−) for the transmission of picture-frame-frequency discrimination data indicating whether the frame frequency of a picture represented by the stream data is equal to 30 Hz or 29.97 Hz;

(7) a positive recording mode discrimination data signal line HS(+) and a negative recording mode discrimination data signal line HS(−) for the transmission of dubbing-recording-mode discrimination data indicating whether the dubbing recording mode is equal to a standard recording mode or a high-picture-quality recording mode (a standard-speed recording mode or a high-speed recording mode); and (8) a first positive external data signal line EXT1(+), a first negative external data signal line EXT1(−), a second positive external data signal line EXT2(+), and a second negative external data signal line EXT2(−) for the transmission of external data.

Generally, the sync signal transmitted along the positive and negative sync signal lines SYNC(+) and SYNC(−) is generated by a suitable device in the digital dubbing system. For example, the sync signal may be produced on the basis of the output signal from the standard signal generator 26c (see FIG. 5). Alternatively, the sync signal may be fed from an external with respect to the digital dubbing system. The digital dubbing system implements internal synchronization or external synchronization in response to such a sync signal. The stream data and the sync signal compose main data included in the digital data "Sig. A".

With reference back to FIG. 5, the digital data "Sig. A" from the master server 21 are fed to the first distributor 26a in the distribution amplifier 26. The first distributor 26a branches the digital data "Sig. A" into first data and second data which are a first output signal and a second output signal respectively. The first data (the first output signal) are directed toward the monitor decoder 27. The second data (the second output signal) are directed toward the second distributor 26b. Specifically, the first distributor 26a includes a through transmission line. The digital data "Sig. A" are propagated through the first distributor 26a along the through transmission line before being outputted as the first data (the first output signal) toward the monitor decoder 27. Accordingly, the digital data "Sig. A" are transmitted through the first distributor 26a before reaching the monitor decoder 27. The contents of the digital data "Sig. A" are transmitted from the monitor decoder 27 to the monitor 29 via the MPEG decoder 28, being displayed on the monitor 29. The first distributor 26a generates the second data (the second output signal) from the digital data "Sig. A". The second data (the second output signal) are outputted from the first distributor 26a toward the second distributor 26b as digital data "Sig. B". The digital data "Sig. B" contain digital stream data which result from delaying the stream data in the digital data "Sig. A" by a time interval depending on the current recording mode. The digital data "Sig. B" contain parity data which are generated in response to the delayed stream data, and which replace the parity data in the digital data "Sig. A".

The standard signal generator 26c produces a reference signal (a standard signal). The standard signal generator 26c feeds the reference signal to the first distributor 26a. The first distributor 26a generates and outputs the sync signal in response to the reference signal. In addition, the first distributor 26a feeds the sync signal to the maser server 21. The standard signal generator 26c is capable of producing a new clock signal (a new bit clock signal) and a new sync signal.

The second distributor 26b receives the digital data "Sig. B" from the first distributor 26a, and distributes the digital data "Sig. B" to the slave recorders 2501, 2502, 2503, . . . , and 2517 via the line 24. The second distributor 26b implements parity check responsive to the parity data in the digital data "Sig. B" fed from the first distributor 26a. Then, the second distributor 26b outputs the digital data "Sig. B" toward the slave recorders 2501, 2502, 2503, . . . , and 2517 via the line 24. The line 24 is formed by a cable similar in structure to the cable in FIG. 9. Preferably, the second distributor 26b informs the monitor 29 of the parity check results. In this case, the monitor 29 displays the parity check results.

The slave recorders 2501, 2502, 2503, . . . , and 2517 are of the same structure. Therefore, only the slave recorder 2501 will be explained below in more detail.

Figure 10:
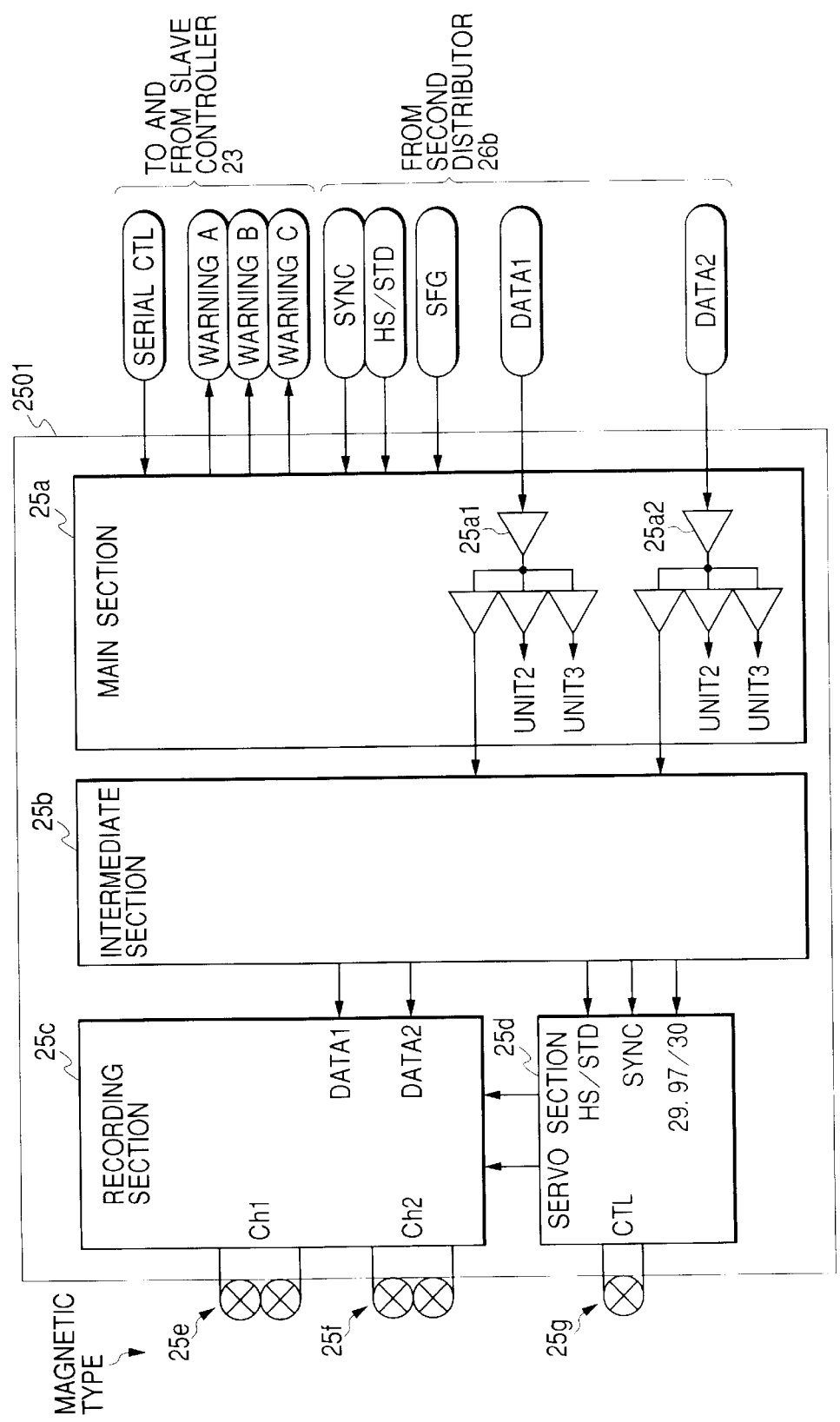
FIG. 10 is a block diagram of a slave recorder in the dubbing system of FIG. 4.

As shown in FIG. 10, the slave recorder 2501 includes a main section 25a. The slave recorder 2501 includes three units (a unit "1", a unit "2", and a unit "3") similar to each other and following the main section 25a. Each of the three units has an intermediate section 25b, a recording section 25c, a servo section 25d, rotary heads 25e and 25f, and a control head 25g. The main section 25a is connected with the distribution amplifier 26 via the line 24. The main section 25a is connected with the slave controller 23 via the line 31. The main section 25a is connected with the intermediate section 25b in each of the three units. The intermediate section 25b is connected with the recording section 25c and the servo section 25d. The recording section 25c is connected with the servo section 25d and the rotary heads 25e and 25f. The servo section 25d is connected with the control head 25g.

The main section 25a contains distributors 25a1 and 25a2. The distributors 25a1 and 25a2 are connected between the distribution amplifier 26 and the intermediate section 25b in each of the three units.

The main section 25a receives a serial control signal CTL from the slave controller 23 via the line 31. The main section 25a can generate warning signals "AA", "B", and "C" related to the three units respectively. The main section 25a transmits the warning signals "A", "B", and "C" to the slave controller 23 via the line 31. The main section 25a receives first stream data DATA1, second stream data DATA2, dubbing-recording-mode discrimination data HS/STD, picture-frame-frequency discrimination data SFG, and a sync signal from the distribution amplifier 26 via the line 24.

The rotary heads 25e and 25f are mounted on a rotary drum. A slave magnetic tape is wound on the rotary drum. The rotary heads 25e and 25f rotate together with the rotary drum. The speed of rotation of the rotary heads 25e and 25f corresponds to either 60 Hz or 59.94 Hz (PAL or NTSC) in both the standard recording mode and the high-picture-quality recording mode (the high-speed recording mode).

The slave recorder 2501 has a self diagnosis function such as a parity check function. The slave recorder 2501 can output three warning signals (the warning signals "A", "B", and "C") regarding the three units therein respectively. The warning signals are transmitted to the slave controller 23. By referring to the warning signals, the slave controller 23 can grasp the operating conditions of each of the three units in the slave recorder 2501. The slave recorder 2501 distributes the first stream data DATA1 and the second stream data DATA2 among information streams. The slave recorder 2501 writes the information streams on slave magnetic tapes via the three units therein. Specifically, the first stream data DATA1 and the second stream data DATA2 are transmitted from the main section 25a to the recording section 25c in each of the three units via the intermediate section 25b therein. The recording section 25c in each of the three units records the first stream data DATA1 and the second stream data DATA2 on a slave magnetic tape via the rotary heads 25e and 25f. The recording section 25c controls the recording of the first stream data DATA1 and the second stream data DATA2 in response to control information fed from the servo section 25d. The dubbing-recording-mode discrimination data HS/STD and the sync signal are transmitted from the main section 25a to the servo section 25d in each of the three units via the intermediate section 25b therein. The picture-frame-frequency discrimination data SFG are transmitted from the main section 25a to the servo section 25d in each of the three units via the intermediate section 25b therein as a 29.97/30-Hz signal. The servo section 25d in each of the three units generates a control signal on the basis of the dubbing-recording-mode discrimination data HS/STD, the sync signal, and the 29.97/30-Hz signal. The servo section 25d records the control signal on the slave magnetic tape via the control head 25g. In addition, the servo section 25d generates control information on the basis of the dubbing-recording-mode discrimination data HS/STD, the sync signal, and the 29.97/30-Hz signal. The servo section 25d feeds the control information to the recording section 25c.

Figure 11:
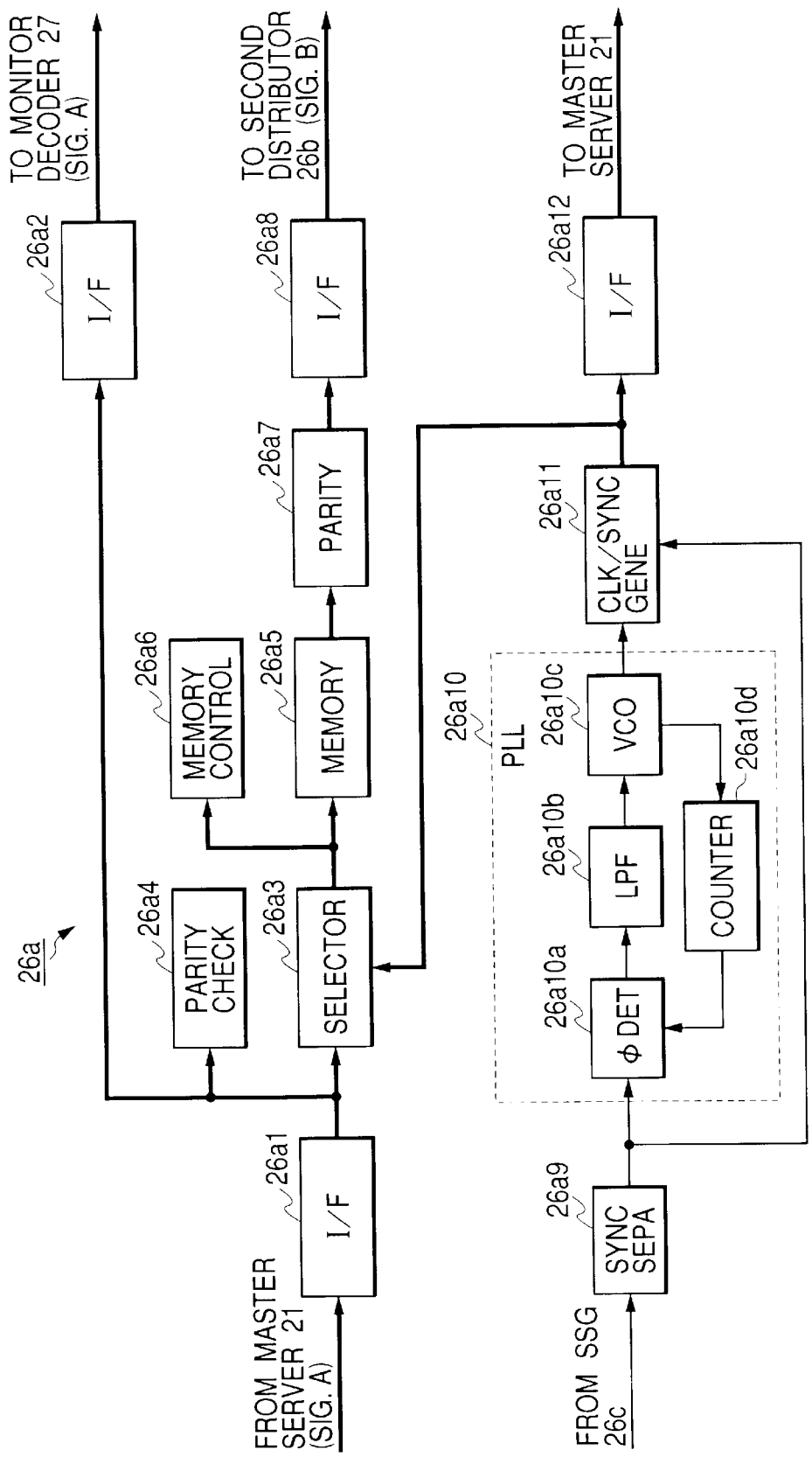
FIG. 11 is a block diagram of a first distributor in FIG. 5.

As shown in FIG. 11, the first distributor 26a in the distribution amplifier 26 includes an interface receiver 26a1, an interface driver 26a2, a selector circuit 26a3, a parity check circuit 26a4, a memory 26a5, a memory control circuit 26a6, a parity circuit 26a7, an output circuit or an interface driver 26a8, a sync separation circuit 26a9, a PLL block 26a10, a clock/sync generation circuit 26a11, and an output circuit or an interface driver 26a12.

The interface receiver 26a1 is connected with the interface board 21c in the master server 21. The interface receiver 26a1 is followed by the interface driver 26a2, the selector circuit 26a3, and the parity check circuit 26a4. The interface driver 26a2 is connected with the monitor decoder 27. The selector circuit 26a3 is connected with the memory 26a5, the memory control circuit 26a6, and the clock/sync generation circuit 26a11. The memory 26a5 is connected with the memory control circuit 26a2 and the parity circuit 26a7. The parity circuit 26a7 is connected with the interface driver 26a8. The interface driver 26a8 is connected with the second distributor 26b. The sync separation circuit 26a9 is connected with the standard signal generator 26c. The sync separation circuit 26a9 is followed by the PLL block 26a10 and the clock/sync generation circuit 26a11. The PLL block 26a10 is connected with the clock/sync generation circuit 26a11. The clock/sync generation circuit 26a11 is followed by the interface driver 26a12. The interface driver 26a12 is connected with the interface board 21c in the master server 21.

The PLL block 26a10 includes a phase error detection circuit 26a10a, a low pass filter 26a10b, a VCO (voltage controlled oscillator) 26a10c, and a counter 26a10d. The counter 26a10d acts as a frequency divider. The phase error detection circuit 26a10a is connected with the sync separation circuit 26a9. The phase error detection circuit 26a10a is also connected with the low pass filter 26a10b and the counter 26a10d. The low pass filter 26a10b is connected with the VCO 26a10c. The VCO 26a10c is connected with the counter 26a10d. The VCO 26a10c is also connected with the clock/sync generation circuit 26a11. The phase error detection circuit 26a10a, the low pass filter 26a10b, the VCO 26a10c, and the counter 26a10d compose a phase lock loop operating as a frequency multiplier.

The digital data "Sig. A" from the master server 21 are received by the interface receiver 26a1. The received digital data "Sig. A" are fed from the interface receiver 26a1 to the interface driver 26a2, the selector circuit 26a3, and the parity check circuit 26a4. The interface driver 26a2 outputs the digital data "Sig. A" to the monitor decoder 27. Thus, the digital data "Sig. A" are propagated through the interface receiver 26a1 and the interface driver 26a2 before being transmitted to the monitor decoder 27.

Figure 12:
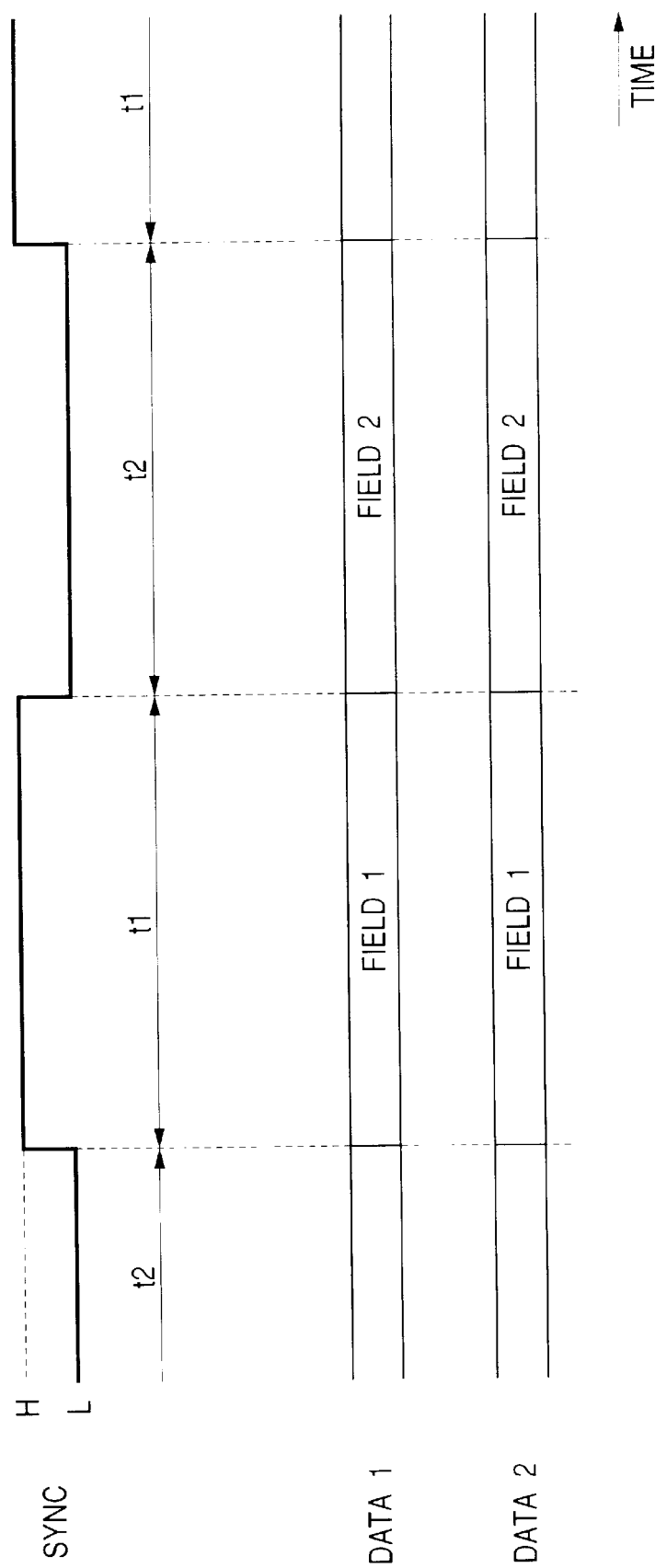
FIG. 12 is a time-domain diagram of a sync signal and the fields represented by stream data in a high-picture-quality recording mode.
Figure 13:
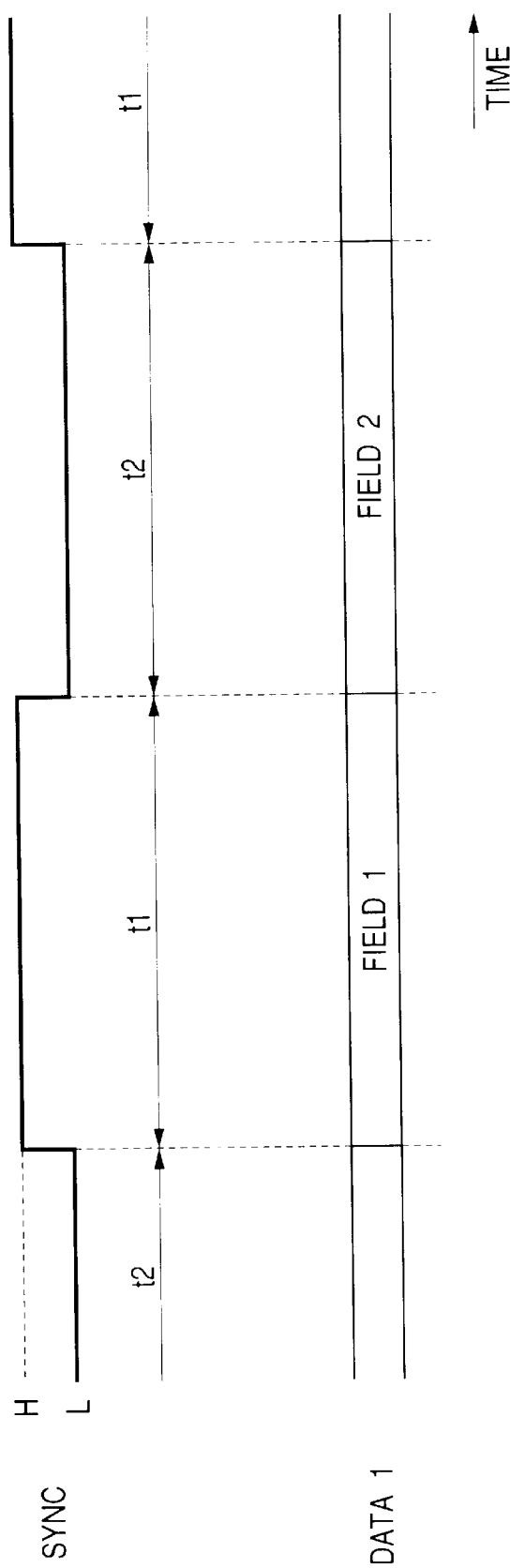
FIG. 13 is a time-domain diagram of a sync signal and the fields represented by stream data in a standard recording mode.

As shown in FIG. 12, in the high-picture-quality recording mode (the high-speed recording mode), the fields represented by the first stream data DATA1 and the second stream data DATA2 in the digital data "Sig. A" have a prescribed phase relation with the sync signal. As shown in FIG. 13, in the standard recording mode, the fields represented by the first stream data DATA1 in the digital data "Sig. A" have a prescribed phase relation with the sync signal. The sync signal has a frequency of either 30 Hz or 29.97 Hz in both the high-picture-quality recording mode and the standard recording mode. The sync signal has a duty ratio of 1:1. The sync signal is the same as a switching pulse signal for providing alternate change between two heads in a pair (or each pair) on the rotary drum.

The standard recording mode uses only the first stream data DATA1. The high-picture-quality recording mode (the high-speed recording mode) uses both the first stream data DATA1 and the second stream data DATA2. As shown in FIGS. 12 and 13, in the standard recording mode or the high-picture-quality recording mode, a field "1" represented by the first stream data DATA1 and the second stream data DATA2 in the digital data "Sig. A" occurs during a time interval t1 for which the sync signal is in its high-level state. In addition, a next field "2" represented by the first stream data DATA1 and the second stream data DATA2 in the digital data "Sig. A" occurs during a next time interval t2 for which the sync signal is in its low-level state. These conditions are iterated. The time interval t1 starts at the moment of the occurrence of a rising edge in the sync signal, and ends at the moment of the occurrence of a falling edge therein. The time interval t2 starts at the moment of the occurrence of a falling edge in the sync signal, and ends at the moment of the occurrence of a rising edge therein.

With reference back to FIG. 11, the parity check circuit 26a4 detects stream-data errors in response to the parity data in the digital data "Sig. A". The parity check circuit 26a4 checks a related transmission system on the basis of the detected stream-data errors. Preferably, the parity check circuit 26a4 informs the monitor 29 of the error check results. In this case, the monitor 29 displays the error check results. The selector circuit 26a3 receives a set of a clock signal (a bit clock signal) and a sync signal from the clock/sync generation circuit 26a11. The selector circuit 26a3 selects one among a set of the clock signal and the sync signal in the digital data "Sig. A" and a set of the clock signal and the sync signal fed from the clock/sync generation circuit 26a11. When the selector circuit 26a3 selects a set of the clock signal and the sync signal in the digital data "Sig. A", the digital data "Sig. A" are passed to the memory 26a5 and the memory control circuit 26a6 through the selector circuit 26a3 without being processed thereby. When the selector circuit 26a3 selects a set of the clock signal and the sync signal fed from the clock/sync generation circuit 26a11, a set of the clock signal and the sync signal in the digital data "Sig. A" are replaced by a set of the clock signal and the sync signal fed from the clock/sync generation circuit 26a11. In this case, the resultant digital data "Sig. A" are outputted from the selector circuit 26a3 to the memory 26a5 and the memory control circuit 26a6. In the event that the master server 21 fails, the selector circuit 26a3 selects a set of the clock signal and the sync signal fed from the clock/sync generation circuit 26a11 and outputs them to the later stage. The selection of a set of the clock signal and the sync signal fed from the clock/sync generation circuit 26a11 enables the operation of the slave recorders 2501, 2502, 2503, . . . , and 2517 to be checked.

The memory control circuit 26a6 generates a delay control signal in response to the dubbing-recording-mode discrimination data HS/STD in the digital data "Sig. A". The delay control signal provides delay conditions for delaying the first stream data DATA1 and the second stream data DATA2 in the digital data "Sig. A" by a time interval from the moment of the occurrence of a rising edge of the sync signal in the digital data "Sig. A". The memory control circuit 26a6 outputs the delay control signal to the memory 26a5. The digital data "Sig. A" are written into and read out from the memory 26a5 before being fed to the parity circuit 26a7. Preferably, only the first stream data DATA1 and the second stream data DATA2 in the digital data "Sig. A" are written into and read out from the memory 26a:5. In this case, the digital data "Sig. A" except the first stream data DATA1 and the second stream data DATA2 bypass the memory 26a5. The timing of writing the first stream data DATA1 and the second stream data DATA2 into the memory 26a5 or the timing of reading out the first stream data DATA1 and the second stream data DATA2 therefrom is controlled in response to the delay control signal. This timing control is designed so that the first stream data DATA1 and the second stream data DATA2 outputted from the memory 26a5 will have a phase retardation (a phase delay) relative to the moment of the occurrence of every rising edge in the sync signal. The moment of the occurrence of every rising edge in the sync signal is defined as a phase reference. The timing control uses the bit clock signal so that a unit change in the timing corresponds to a 1-bit period. The phase retardation (the phase delay) provided by the memory 26a5 is chosen in accordance with angular positions of used heads (active heads) on each rotary drum in the slave recorders 2501, 2502, 2503, . . . , and 2517.

The above-indicated delay conditions are as follows. There are heads on each rotary drum. One or more are selected from the heads on the rotary drum as active heads in accordance with the standard recording mode or the high-picture-quality recording mode. The active heads correspond to the heads 25*e* and 25*f* in FIG. 10. A phase reference position corresponding to the previously-indicated phase reference is defined on the rotary drum. The stream data assigned to the selected heads (the active heads) are delayed by time intervals corresponding to the angular positions of the heads relative to the phase reference position, that is, corresponding to the angular intervals from the phase reference position to the heads.

Figure 14:
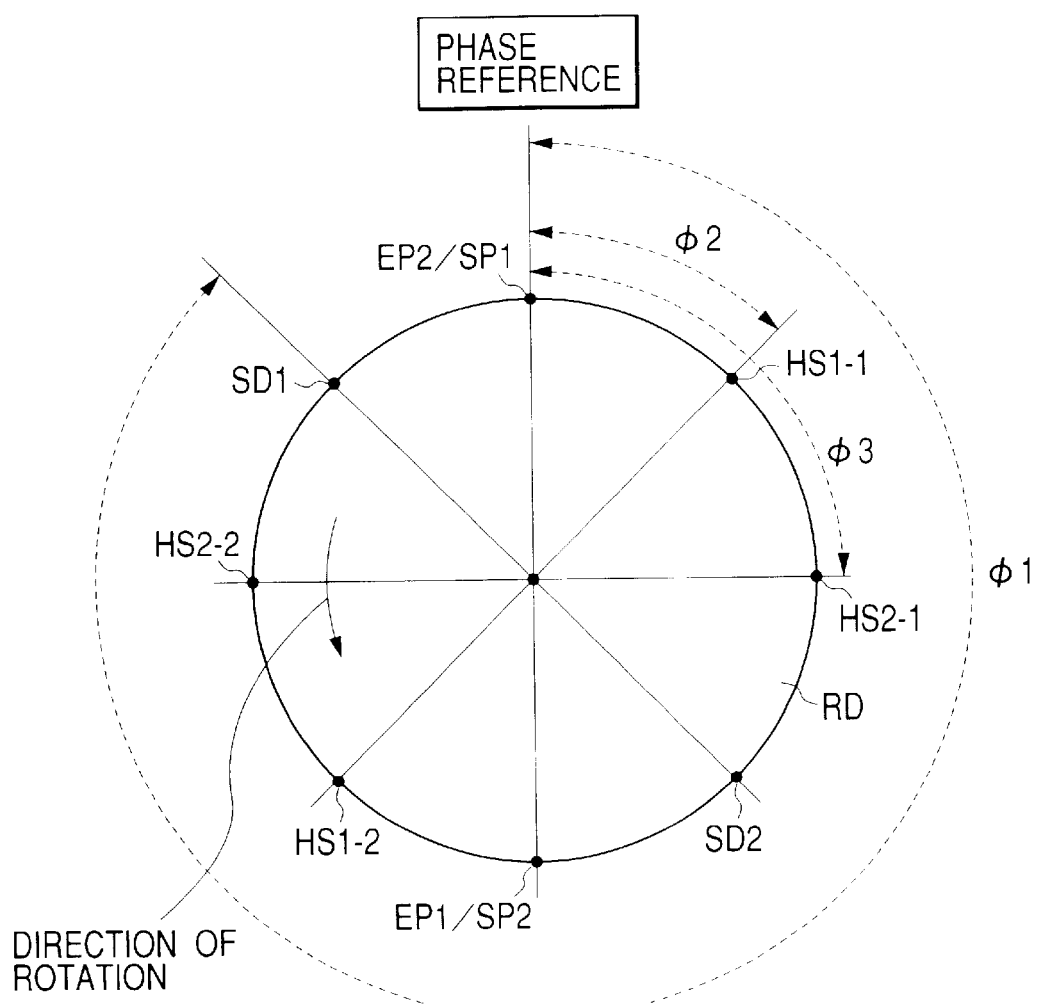
FIG. 14 is a diagram of a rotary drum and heads in the slave recorder in the dubbing system of FIG. 4.

As shown in FIG. 14, a rotary drum RD is provided with a pair of diametrically-opposed heads EP2/SP1 and EP1/SP2, a pair of diametrically-opposed heads HS1-1 and HS1-2, a pair of diametrically-opposed heads HS2-1 and HS2-2, and a pair of diametrically-opposed heads SD1 and SD2. The position of the head EP2/SP1 is defined as the phase reference position. The head EP1/SP2 is spaced from the head EP2/SP1 by an angular interval of π (180°). The head SD1 is spaced from the phase reference position by a prescribed angular interval φ1 in the clockwise direction. The head SD2 is spaced from the head SD1 by an angular interval of π (180°). The head HS1-1 is spaced from the phase reference position by a prescribed angular interval φ2 in the clockwise direction. The head HS1-2 is spaced from the head HS1-1 by an angular interval of π (180°). The head HS2-1 is spaced from the phase reference position by a prescribed angular interval φ3 in the clockwise direction. The head HS2-2 is spaced from the head HS2-1 by an angular interval of π (180°). The recording section 25*c* includes an arrangement for selecting ones from the head pairs in response to the dubbing-recording-mode discrimination data HS/STD. The pair of the heads SD1 and SD2 are assigned to the standard recording mode. The pair of the heads HS1-1 and HS1-2, and the pair of the heads HS2-1 and HS2-2 are assigned to the high-picture-quality recording mode. Specifically, in the standard recording mode, the stream data DATA1 are recorded on a related slave magnetic tape by the pair of the heads SD1 and SD2 while a head switching arrangement in the recording section 25*c* periodically implements change between the heads SD1 and SD2 in response to the switching pulse signal (the sync signal). In this case, the stream data DATA1 are delayed by a time interval corresponding to the prescribed angular interval φ1. In the high-picture-quality recording mode, the first stream data DATA1 are recorded on a related slave magnetic tape by the pair of the heads HS1-1 and HS1-2 while the second stream data DATA2 are recorded thereon by the pair of the heads HS2-1 and HS2-2. In the high-picture-quality recording mode, the head switching arrangement periodically implements change between the heads HS1-1 and HS1-2 and change between the heads HS2-1 and HS2-2 in response to the switching pulse signal (the sync signal). In this case, the first stream data DATA1 are delayed by a time interval corresponding to the prescribed angular interval φ2, and the second stream data DATA2 are delayed by a time interval corresponding to the prescribed angular interval φ3.

Figure 15:
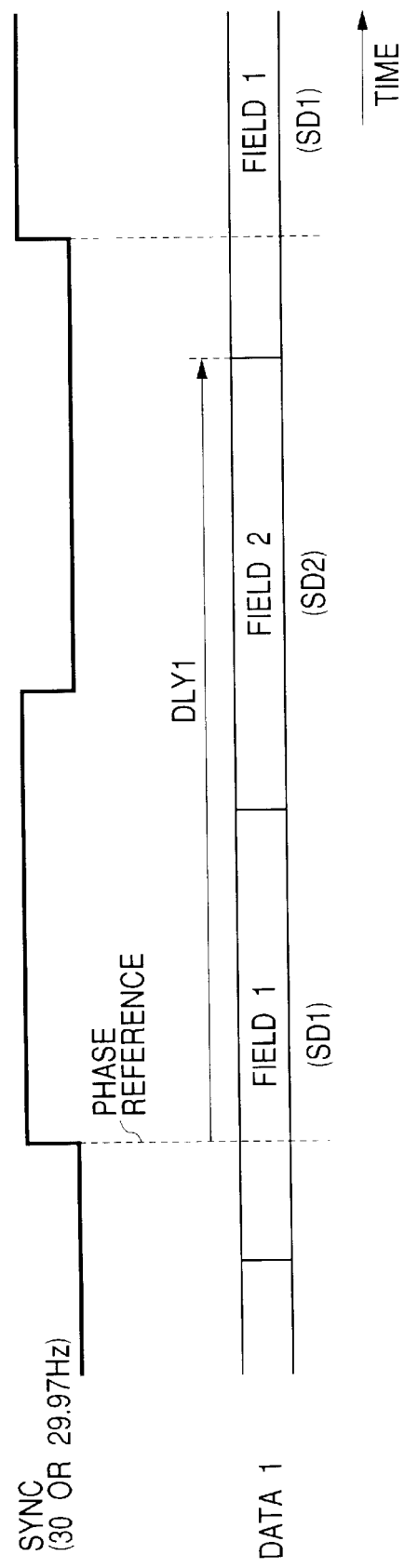
FIG. 15 is a time-domain diagram of a sync signal and the fields represented by delayed stream data in the standard recording mode.
Figure 16:
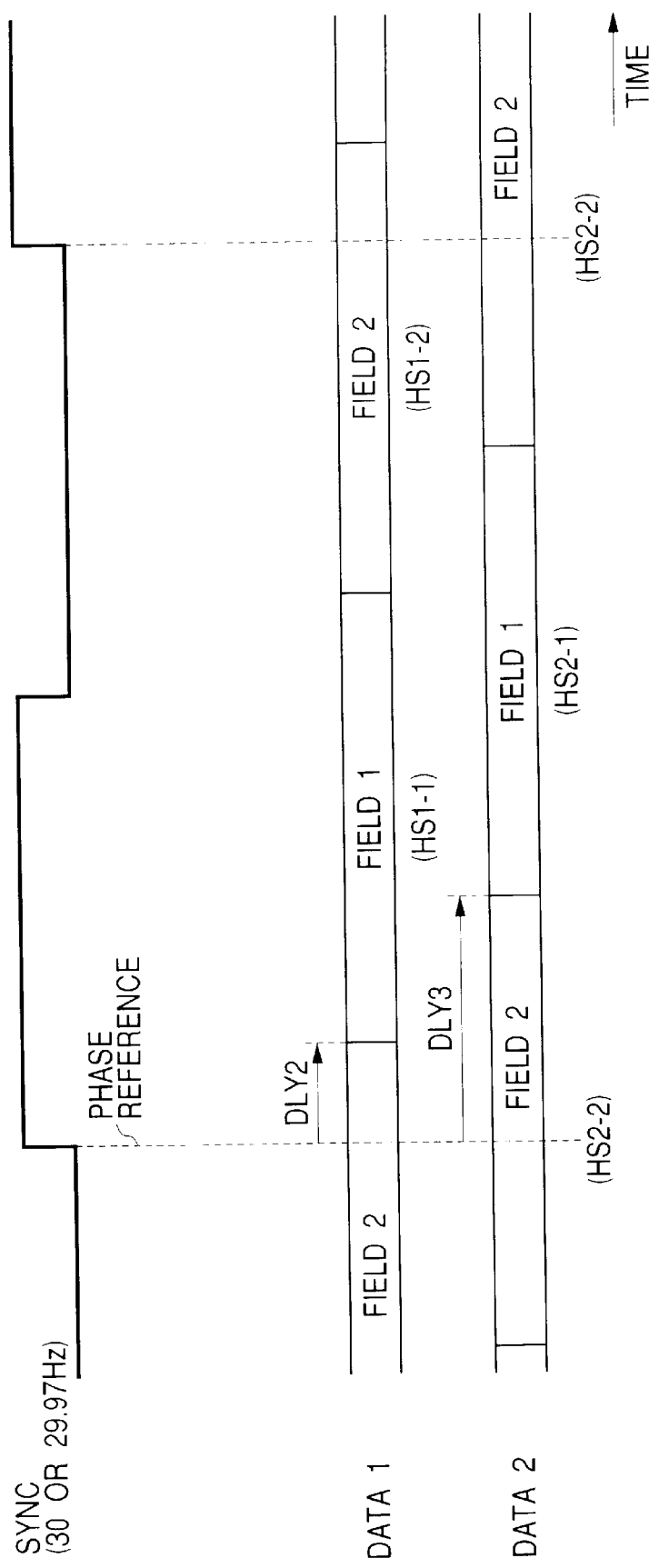
FIG. 16 is a time-domain diagram of a sync signal and the fields represented by delayed stream data in the high-picture-quality recording mode.

As shown in FIGS. 15 and 16, every rising edge in the sync signal provides the phase reference. As shown in FIG. 15, in the standard recording mode, the starting point of every field "1" represented by the stream data DATA1 outputted from the memory 26*a*5 delays from the phase reference by a time interval DLY1 corresponding to the prescribed angular interval φ1. The delay of the stream data DATA1 causes an agreement between the starting point of every field "1" or "2" represented by the stream data DATA1 and the timing of the change between the heads SD1 and SD2. As shown in FIG. 16, in the high-picture-quality recording mode, the starting point of every field "1" represented by the first stream data DATA1 outputted from the memory 26*a*5 delays from the phase reference by a time interval DLY2 corresponding to the prescribed angular interval φ2 while the starting point of every field "1" represented by the second stream data DATA2 outputted from the memory 26*a*5 delays from the phase reference by a time interval DLY3 corresponding to the prescribed angular interval φ3. The delay of the first stream data DATA1 causes an agreement between the starting point of every field "1" or "2" represented by the first stream data DATA1 and the timing of the change between the heads HS1-1 and HS1-2. The delay of the second stream data DATA2 causes an agreement between the starting point of every field "1" or "2" represented by the second stream data DATA2 and the timing of the change between the heads HS2-1 and HS2-2.

In the case where the frame frequency related to the first stream data DATA1 and the second stream data DATA2 is equal to 30 Hz, the delay DLYn of the stream data assigned to the heads spaced from the phase reference position by φn and φn+π is given as follows.

$$DLYn(\text{sec}) = (\phi n/2\pi) \cdot (1/30)$$

where DLYn means DLY1, DLY2, or DLY3, and φn means φ1, φ2, or φ3. The stream-data delays or the stream-data delay time intervals DLY1, DLY2, and DLY3 are provided by the memory 26*a*5. The determination of the delay timings by the memory 26*a*5 is responsive to the bit clock signal so that a unit change in the delay timings corresponds to a 1-bit period. Accordingly, the stream-data delays (the stream-data delay time intervals) DLY1, DLY2, and DLY3 can be accurately and finely set. Furthermore, the stream-data delays DLY1, DLY2, and DLY3 can be managed by a single place, that is, the combination of the memory 26*a*5 and the memory control circuit 26*a*6. In the case where the frame frequency related to the first stream data DATA1 and the second stream data DATA2 is equal to 29.97 Hz, the delay DLYn of the stream data assigned to the heads spaced from the phase reference position by φn and φn+π is given similarly. Specifically, desired stream-data delays (the stream-data delay time intervals) DLY1, DLY2, and DLY3 are predetermined for a frame frequency of 30 Hz, and also desired stream-data delays (the stream-data delay time intervals) DLY1, DLY2, and DLY3 are predetermined for a frame frequency of 29.97 Hz. Corresponding ones of the desired stream-data delays DLY1, DLY2, and DLY3 are selected in response to the frame discrimination data signal which indicates whether the frame frequency is equal to 30 Hz or 29.97 Hz. The memory control circuit 26*a*6 controls the memory 26*a*5 to provide the selected stream-data delays DLY1, DLY2, and DLY3.

Figure 17:
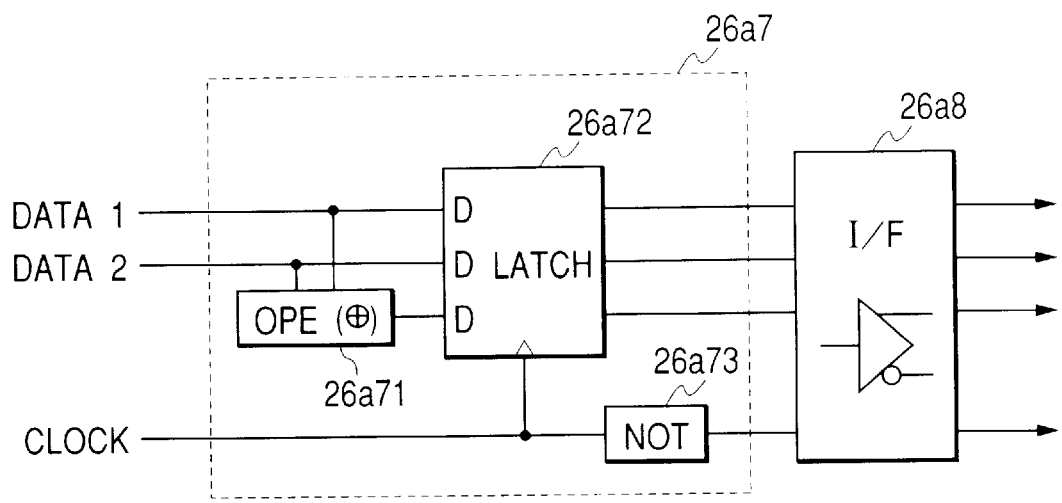
FIG. 17 is a block diagram of a parity circuit in FIG. 11.
Figure 18:
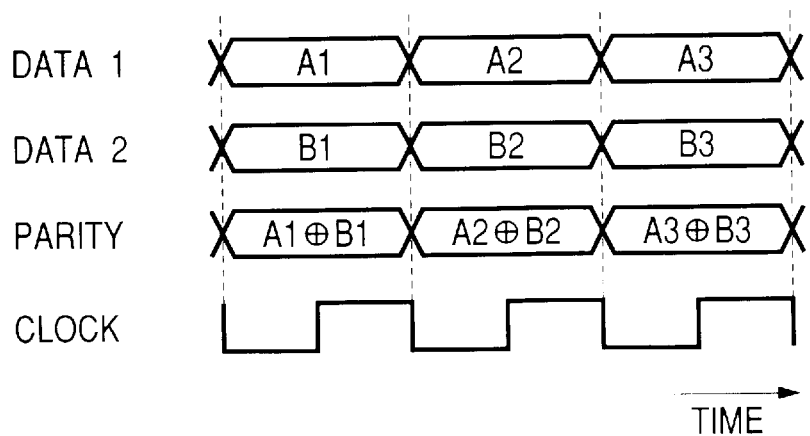
FIG. 18 is a time-domain diagram of stream data, parity data, and a clock signal in the parity circuit of FIG. 17.

As shown in FIG. 17, the parity circuit 26*a*7 includes an operation circuit 26*a*71, a latch or a counter 26*a*72, and a NOT circuit 26*a*73. The operation circuit 26*a*71 receives the first stream data DATA1 and the second stream data DATA2 from the memory 26*a*5. The operation circuit 26*a*71 executes given operation (for example, Exclusive-OR operation) between the first stream data DATA1 and the second stream data DATA2, thereby generating new parity data for checking conditions of the transmission of the stream data DATA1 and DATA2. The operation circuit 26*a*71 outputs the parity data to the latch 26*a*72. The clock signal generated in the digital dubbing system is applied to the latch 26a72 and the NOT circuit 26a73. The device 26a72 latches the first stream data DATA1, the second stream data DATA2, and the parity data, and outputs the latched data to the interface driver 26a8 in response to the clock signal. Thus, the first stream data DATA1, the second stream data DATA2, and the parity data are outputted from the latch 26a72 to the interface driver 26a8 in synchronism with the clock signal. The NOT circuit 26a73 inverts the clock signal. The NOT circuit 26a73 outputs the inversion-resultant clock signal to the interface driver 26a8. As shown in FIG. 18, the timing of every change of the first stream data DATA1, the timing of every change of the second stream data DATA2, and the timing of every change of the parity data are provided by a falling edge in the clock signal.

The first stream data DATA1, the second stream data DATA2, the parity data, and the clock signal propagate through the interface driver 26a8 before being outputted from the first distributor 26a to the second distributor 26b as the digital data "Sig. B" (see FIGS. 5, 11, and 17). The sync separation circuit 26a9 in the first distributor 26a of FIG. 11 receives the output signal of the standard signal generator 26c (see FIG. 5). The sync separation circuit 26a9 extracts a timing signal (a sync signal) from the output signal of the standard signal generator 26c by a sync separation procedure. The sync separation circuit 26a9 outputs the timing signal (the sync signal) to the PLL block 26a10 and the clock/sync generation circuit 26a11. The PLL block 26a10 generates a clock signal (a bit clock signal) in response to the timing signal. The PLL block 26a10 outputs the clock signal to the clock/sync generation circuit 26a11.

The clock/sync generation circuit 26a11 produces a desired sync signal and a desired clock signal (a desired bit clock signal) from the output signals of the sync separation circuit 26a9 and the PLL block 26a10. The clock/sync generation circuit 26a11 feeds the sync signal and the clock signal to the selector circuit 26a3 and the interface driver 26a12. The interface driver 26a12 outputs the sync signal and the clock signal to the interface board 21c in the master server 21.

As previously mentioned, the first stream data DATA1 and the second stream data DATA2 are delayed from the reference timing by the time intervals corresponding to the angular intervals between the used heads and the phase reference position. The delays of the first stream data DATA1 and the second stream data DATA2 compensate for phase errors which would be caused by the structure and arrangement of the heads. As a result of the delays, the first stream data DATA1 and the second stream data DATA2 are normally recorded on a slave magnetic tape by the heads in pairs which are changed in response to the reference timing signal (the sync signal).

As previously mentioned, the parity circuit 26a7 (the operation circuit 26a71) in the first distributor 26a generates the parity data on the basis of the delayed first stream data DATA1 and the delayed second stream data DATA2. During the transmission of the delayed first stream data DATA1 and the delayed second stream data DATA2, errors caused therein are checked by referring to the parity data. Preferably, the error check arrangement is provided in the second distributor 26b or the slave recorders 2501, 2502, 2503, . . . , and 2517. The error check arrangement is simple in structure, and is highly efficient in error detection.

As previously mentioned, the interface board 21c in the master server 21 generates the parity data on the basis of the stream data. The parity check circuit 26a4 in the first distributor 26a detects stream-data errors in response to the parity data. The parity check circuit 26a4 informs the monitor 29 of the error check results. The monitor 29 displays the error check results. The error check arrangement is simple in structure, and is highly efficient in error detection.

As previously mentioned, the stream data to be dubbed are reproduced from a DLT tape 30 while the DLT tape 30 is driven by the DLT device 20. The reproduced stream data are stored into the hard disk drive 21b. Each time dubbing is required, the stream data are transferred from the hard disk drive 21b to the slave recorders 2501, 2502, 2503, . . . , and 2517. In this case, it is unnecessary to access the DLT tape 30. Thus, it is possible to prevent the occurrence of a damage to the DLT tape 30 which might be caused by frequent accesses thereto.

As previously mentioned, stream data recorded on a DLT tape 30 are scrambled, and the personal computer 21a in the master server 21 descrambles the stream data reproduced from the DLT tape 30. The scrambled stream data are effective to copy protection.

What is claimed is:

1. An apparatus for dubbing information onto a plurality of slave recording mediums, comprising:
   a plurality of slave recorders each including a rotary drum, heads mounted on the rotary drum at positions spaced from a phase reference position on the rotary drum by different angular intervals respectively, and means for selecting at least one from the heads as an active head in accordance with a designated recording mode selected from among different recording modes;
   means for delaying non-delayed stream data by a delay time interval depending on the designated recording mode to form delayed stream data; and
   a distributor for distributing the delayed stream data to the slave recorders, wherein each of the slave recorders records the delayed stream data on a slave recording medium by the active head;
   wherein the delay time Interval corresponds to the angular interval between the phase reference position and the position of the active head.

2. An apparatus for dubbing information onto a plurality of slave recording mediums, comprising:
   memory means for temporarily storing the information;
   control means for deciding a recording mode about the information and controlling the memory means so that the information will be outputted from the memory means with a delay time depending on the decided recording mode;
   a plurality of slave recorders each including a rotary drum, heads mounted on the rotary drum at positions spaced from a phase reference position on the rotary drum by different angular intervals respectively, the heads being in pairs each having two heads at diametrically-opposed positions respectively, and means for selecting at least one from the pairs as an active head pair in accordance with the decided recording mode; and
   a distributor for distributing the information outputted from the memory means to the slave recorders, wherein each of the slave recorders records the distributed information on a slave recording medium by the active head pair.

3. A method of dubbing information onto a plurality of slave recording mediums, comprising the steps of:
   temporarily storing the information in memory means;
   deciding a recording mode about the information and controlling the memory means so that the information will be outputted from the memory means with a delay time depending on the decided recording mode;

using a plurality of slave recorders each including a rotary drum, heads mounted on the rotary drum at positions spaced from a phase reference position on the rotary drum by different angular intervals respectively, the heads being in pairs each having two heads at diametrically-opposed positions respectively, and means for selecting at least one from the pairs as an active head pair in accordance with the decided recording mode; and distributing the information outputted from the memory means to the slave recorders, wherein each of the slave recorders records the distributed information on a slave recording medium by the active head pair.

4. A method as recited In claim 3, further comprising the step of generating parity data in response to the information outputted from the memory means.

5. A method as recited In claim 3, further comprising the steps of generating parity data in response to the information stored in the memory means, checking the information stored in the memory means in response to the parity data, and indicating a result of said checking.

6. A method as recited in claim 3, further comprising the step of descrambling scrambled digital data into the information stored in the memory means.

* * * * *